(12) United States Patent
Chiang et al.

(10) Patent No.: US 6,965,461 B1
(45) Date of Patent: Nov. 15, 2005

(54) IMAGE SCANNER PROVIDED WITH OPTICAL MODULE ACTUATED BY COVER

(75) Inventors: William Chiang, Taoyuan (TW); Jih Yung Lu, Taipei Hsien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/394,192

(22) Filed: Sep. 10, 1999

(30) Foreign Application Priority Data

May 29, 1999 (TW) .................................. 88208719 U (51) Int. Cl.⁷ ................................................. H04N 1/04
(52) U.S. Cl. ...................... 358/497; 358/486; 358/488; 358/474
(58) Field of Search ................................ 358/474, 471, 358/497, 494, 486, 488; 382/312, 318, 319; 355/75; 399/380, 17, 376; 250/234–236

(56) References Cited

U.S. PATENT DOCUMENTS

| | | | | |
|---|---|---|---|---|
| 4,540,269 A | | 9/1985 | Nishiyama | ................... 340/689 |
| 4,912,507 A | * | 3/1990 | Kinoshita | ................... 399/157 |
| 5,223,904 A | * | 6/1993 | Umezawa | ................... 399/380 |
| 5,541,713 A | * | 7/1996 | Takatsuki et al. | ........... 399/380 |
| 5,682,252 A | * | 10/1997 | Ando | .......................... 358/474 |
| 5,778,276 A | * | 7/1998 | Hasegawa | ................... 399/380 |
| 5,900,950 A | * | 5/1999 | Hsu | ........................... 358/497 |
| 5,917,616 A | * | 6/1999 | Chou et al. | ................. 358/488 |
| 6,163,388 A | * | 12/2000 | Lee et al. | .................... 358/488 |

FOREIGN PATENT DOCUMENTS

JP 07-311732 11/1995

* cited by examiner

*Primary Examiner*—Cheukfan Lee
(74) *Attorney, Agent, or Firm*—Ladas & Parry

(57) ABSTRACT

An image scanner includes a main body, an optical module, a switch, a trigger member and a cover. The main body has a window for supporting a document. The optical module is used for scanning the document. The switch is used for actuating the optical module to scan the document. The cover is movably connected to the main body. The trigger member is provided on the main body or the cover for turning on the switch so as to actuate the optical module when the cover is closed to cover the window.

15 Claims, 8 Drawing Sheets

FIG. 9B

IMAGE SCANNER PROVIDED WITH OPTICAL MODULE ACTUATED BY COVER

BACKGROUND OF THE INVENTION

1. Field of the Invention

The present invention relates in general to a conveniently operated image scanner.

2. Description of the Related Art

When using an image scanner to scan documents, the user operates software by clicking a "scan" icon on the monitor or operates hardware by pushing a "scan" button on the image scanner. Basically, for scanning each document, the user needs to take an action. That is inconvenient, especially when the user intends to scan a large quantity of documents.

SUMMARY OF THE INVENTION

An object of the present invention is to provide a conveniently operated image scanner that solves the above-mentioned problem.

The image scanner of the present invention includes a main body, an optical module, a switch, a trigger member and a cover. The main body has a window for supporting a document. The optical module is used for scanning the document. The switch is used for actuating the optical module to scan the document. The cover is movably connected to the main body. The trigger member is provided on the main body or the cover for turning on the switch so as to actuate the optical module when the cover is closed to cover the window.

It is understood that the operation of the image scanner of the present invention is very easy. The user puts the document on the window and closes the cover. Without other action by the user, the image scanner automatically scans the document. There is no need to repeatedly push a button or click an icon for each scanning. The operation of the image scanner of the present invention is simple and efficient.

BRIEF DESCRIPTION OF THE DRAWINGS

The present invention can be more fully understood by reading the subsequent detailed description and examples with references made to the accompanying drawings, wherein:

FIG. 5C depicts the state that the switch of the fourth embodiment is turned on;

DETAILED DESCRIPTION OF THE PREFERRED EMBODIMENT

Figure 1A:
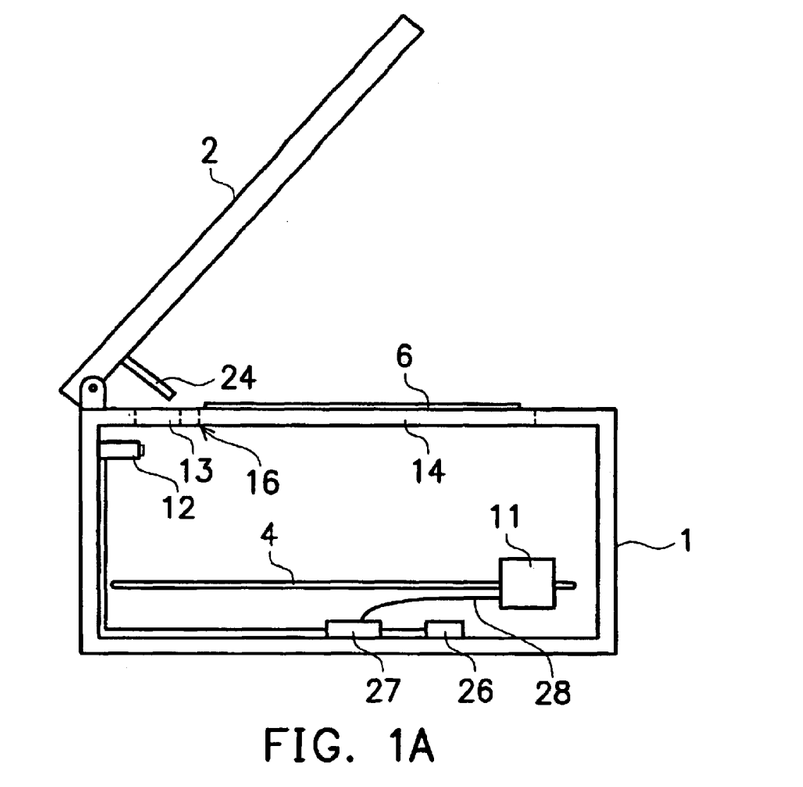
FIG. 1A is a sectional diagram of an image scanner with the cover thereof opened in accordance with a first embodiment of the present invention.

Embodiments one, two, three and four:

Referring to FIG. 1A, an image scanner of a first embodiment of the present invention includes a main body 1 and a cover 2. On the top surface of the main body 1 are provided a window 14 and a hole 13, while inside the main body 1 are provided an optical module 11, a rod 4, a flexible PCB 28, a controller 27, a buzzer 26 and a switch 12. Furthermore, on the cover 2 is provided a bar 24 corresponding to the hole 13.

Figure 1B:
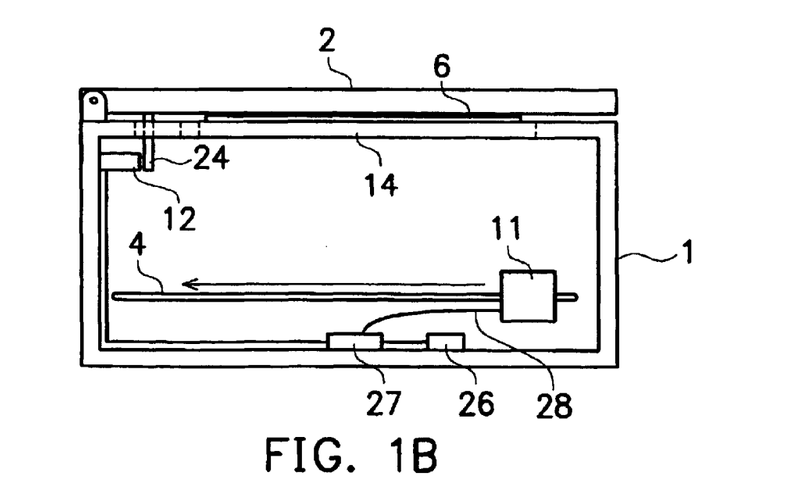
FIG. 1B is a sectional diagram of an image scanner with the cover thereof closed in accordance with the first embodiment of the present invention.

Referring to FIG. 1B, the bar 24 goes through the hole 13 to push the switch 12 when the cover 2 is closed to cover the window 14. In this embodiment, the switch 12 is a button switch. The push by the bar 24 turns on the switch 12 and actuates the optical module 11 via the controller 27 and the flexible PCB 28 to scan a document 6 (if the document is disposed on the window 14).

However, if there is no document on the window 14, the optical module 11 should not perform the scanning. Thus, after being actuated, the optical module 11 may operate in two different ways: (1) Before performing the scanning, the optical module 11 detects if there is a document on the window 14. If yes, then the optical module 11 moves along the rod 4 to scan the document in accordance with a resolution and paper size pre-set by the user. (2) Before performing the scanning, the optical module 11 detects if there is a document on the window 14. If yes, then the optical module 11 moves along the rod 4 to "pre-scan" the document with a low resolution so as to find out the scanned document size.

Figure 2A:
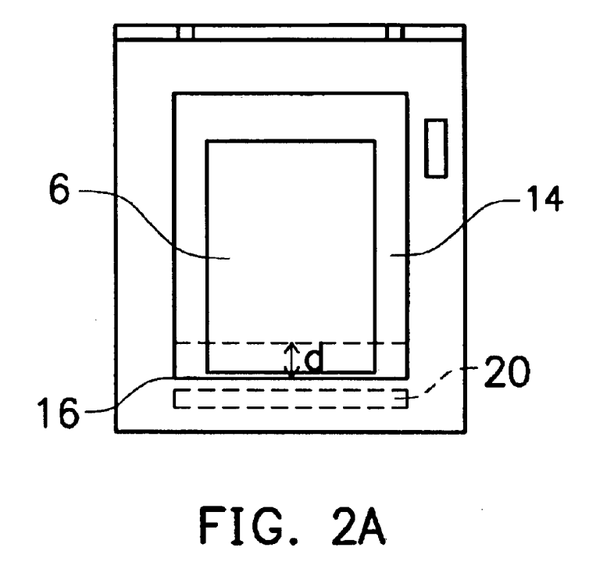
FIG. 2A is a top view of the main body of the image scanner in accordance with the first embodiment of the present invention.
Figure 2B:
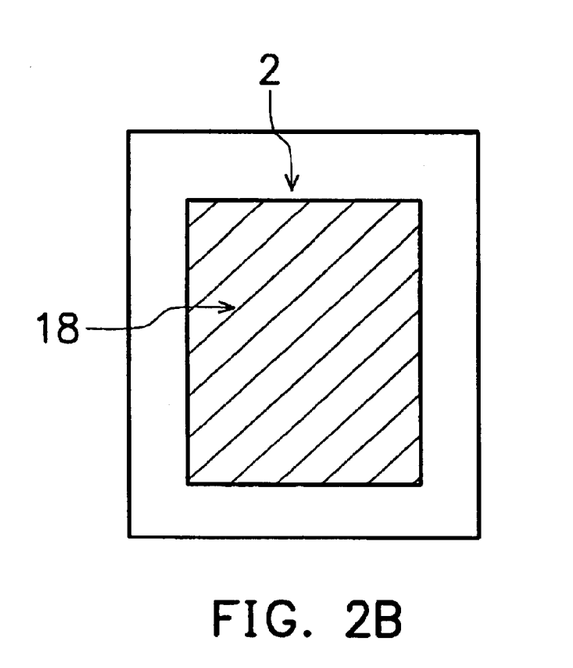
FIG. 2B is a bottom view of the cover of the image scanner in accordance with the first embodiment of the present invention.

The "detection before scanning" is further interpreted as follows: Referring to FIGS. 2A and 2B, a dark or black background 18 is provided on the cover 2 corresponding to the window 14. Reference number 20 indicates the start position of the optical module 11, which is also the position which the optical module 11 stands by. Generally, a scanned document is of light color or white. The user puts the document 6 on the window 14 edge to edge. To detect whether a document is disposed on the window 14, the optical module 11 scans the area within a distance "d" away from the edge 16 of the window 14. If a document is disposed on the window 14, then the gray scale value obtained from the detecting is great because scanned documents generally are of light color. If no document is disposed on the window 14, then the gray scale value obtained from the detecting is small because the background 18 of the cover 2 is dark. Therefore, if the gray scale value obtained from the detecting is greater than a predetermined value, i.e., substantially different from the gray level of the dark background, then there must be a document on the window 14 and the optical module 11 scans the whole window 14. On the other hand, if the obtained gray scale value is smaller than a predetermined value, i.e., substantially close to the gray level of the dark background, then the optical module 11 goes back to stand by. To sum up, if the switch 12 is turned on by closing the cover 2, then the optical module 11 scans the area within a distance "d" away from the edge 16 of the window 14 to ascertain whether there is a document on the window 14 or not. If there is, then the optical module 11 scans the window in accordance with the resolution and paper size pre-set by the user or rapidly pre-scans the whole window 14 with a low resolution.

After finishing the scanning, the optical module 11 automatically moves back to the start position 20. However, if the user opens the cover 2 before the scanning is finished, then the switch 12 is turned off and the buzzer 26 is actuated to warn the user.

It is understood from the above description that the operation of the image scanner is very easy. The user puts the document on the window and closes the cover. Without other action by the user, the image scanner automatically scans the document. There is no need to repeatedly push the button for each scanning. The operation of the image scanner of the present invention is simple and efficient.

Figure 3A:
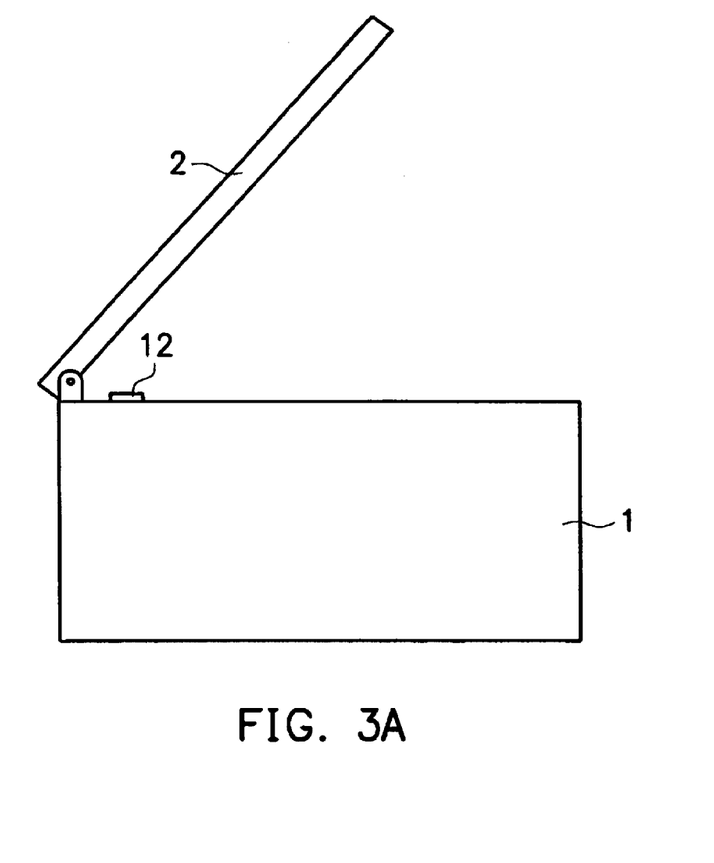
FIG. 3A is a sectional diagram of an image scanner with the cover thereof opened in accordance with a second embodiment of the present invention.
Figure 3B:
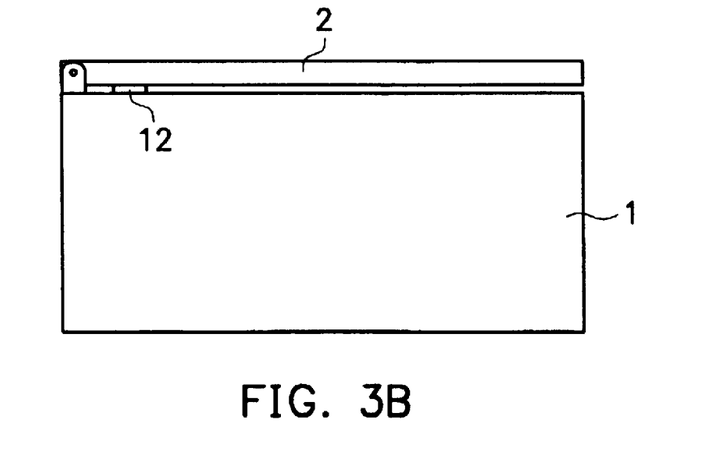
FIG. 3B is a sectional diagram of the image scanner with the cover thereof closed in accordance with the second embodiment of the present invention.
Figure 4:
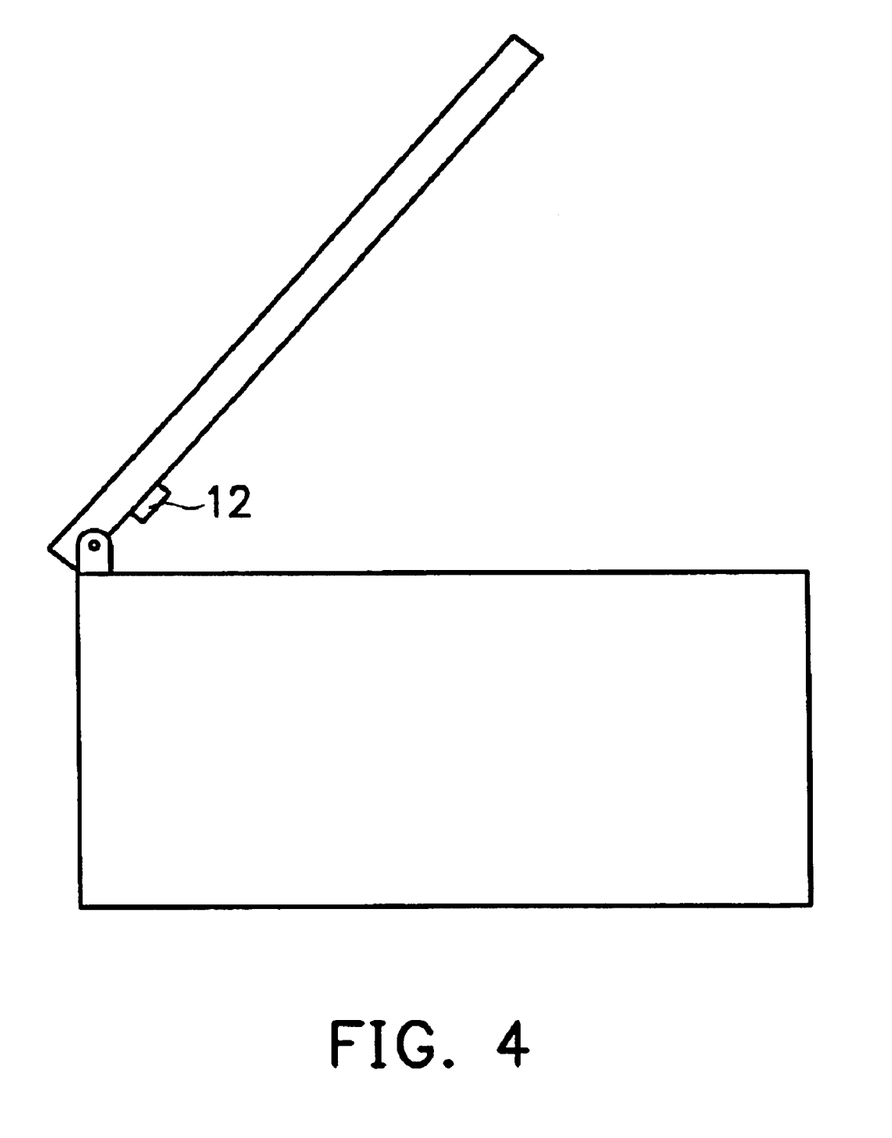
FIG. 4 is a sectional diagram of an image scanner with the cover thereof opened in accordance with a third embodiment of the present invention.
Figure 5A:
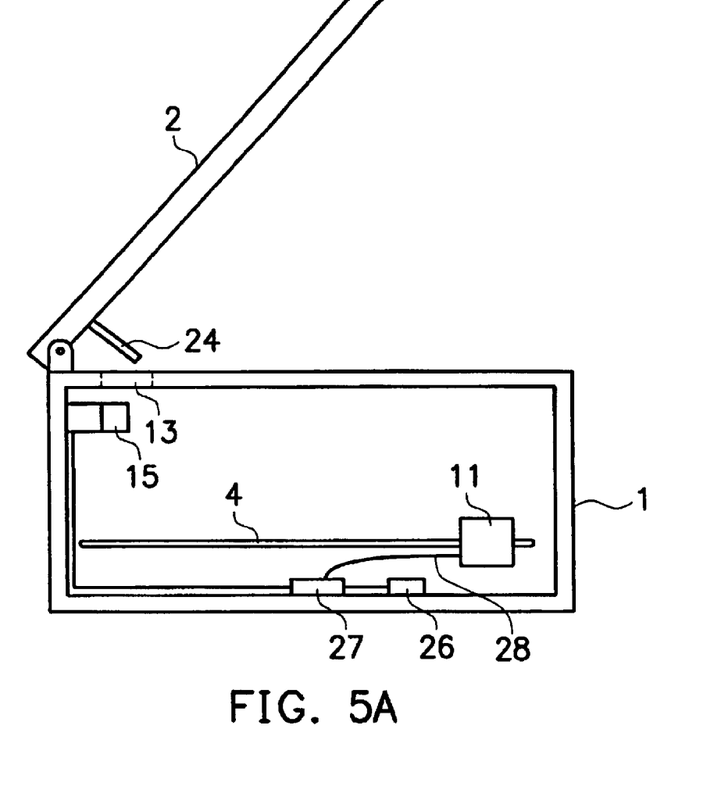
FIG. 5A is a sectional diagram of an image scanner with the cover thereof opened in accordance with a fourth embodiment of the present invention.
Figure 5B:
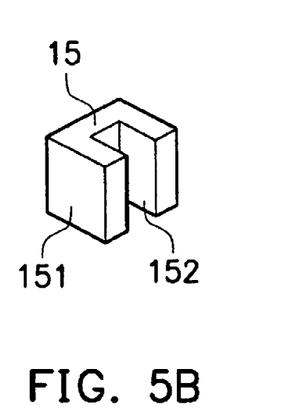
FIG. 5B is a perspective diagram of a switch of the image scanner in accordance with the fourth embodiment of the present invention.
Figure 5C:
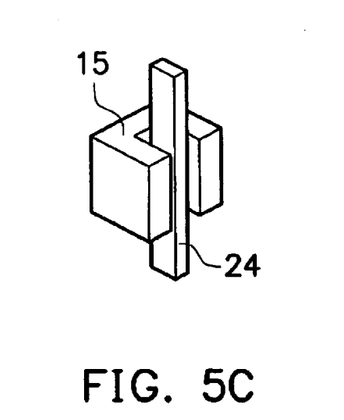

The above-mentioned switch 12 can be modified. FIGS. 3A and 3B depict a second embodiment of the present invention, wherein the switch 12 is mounted on the main body 1 of the image scanner and is near the pivots of the cover 2. The switch 12 is turned on when the cover 2 is closed to cover the window. The bottom surface of the cover 2 functions as a trigger member like the bar 24 mentioned in the first embodiment. In this embodiment, the hole 13 and the bar 24 are not needed. FIG. 4 depicts a third embodiment of the present invention, wherein the switch 12 is mounted on the cover 2. In this embodiment, the top surface of the main body 1 functions as a trigger member to turn on the switch 12. FIGS. 5A, 5B and 5C depict a fourth embodiment of the present invention, wherein a photo switch 15 is provided in the main body 1 of the image scanner. In this embodiment, the photo switch 15 is a photo sensor having a body 151, a light emitter (not shown) and a receiver (not shown). On the body 151 is provided a recess 152. A light is emitted from the emitter through the recess 152 to the receiver. When the cover 2 is closed, the bar 24 on the cover 2 enters the recess 152 to obstruct the light. Then, the receiver cannot receive the light and generates a change of a digital signal. The changed digital signal is sent to the controller 27 so that the optical module 11 performs the "detection before scanning".

Figure 6:
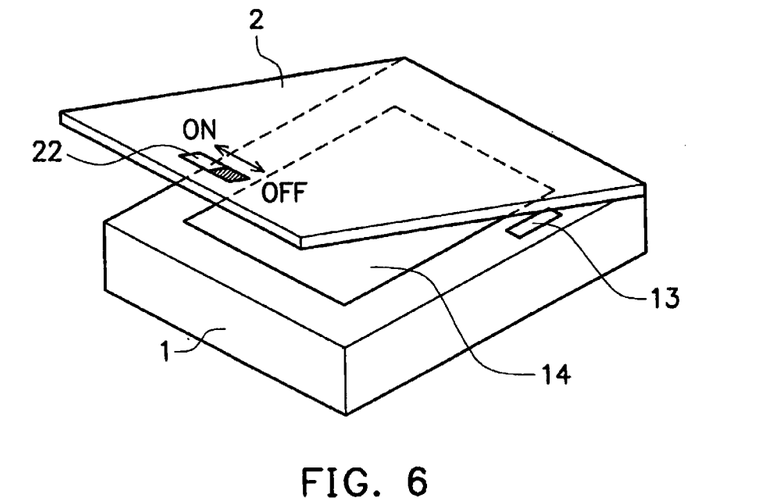
FIG. 6 is a perspective diagram of an image scanner in accordance with a fifth embodiment of the present invention.

Embodiment five:

In the first, second, third and fourth embodiments mentioned above, the optical module 11 detects if there is a document on the window 14 when the switches 12, 15 are turned on. However, if the user intends to continuously scan a plurality of documents, then the detection before scanning is not needed for each scanning. In this embodiment, therefore, a function of a compulsory scanning is provided. Referring to FIG. 6, another switch 22 is mounted on the cover 2. When the user intends to scan many pages of document, he turns on the switch 22. Then, the optical module 11 does not detect if there is a document on the window 14 before each scanning. Instead, the optical module 11 directly scans a limited area in accordance with a resolution and paper size pre-set by the user, or the optical module 11 rapidly pre-scans the whole window area with a low resolution so as to find out the document size.

Figure 7:
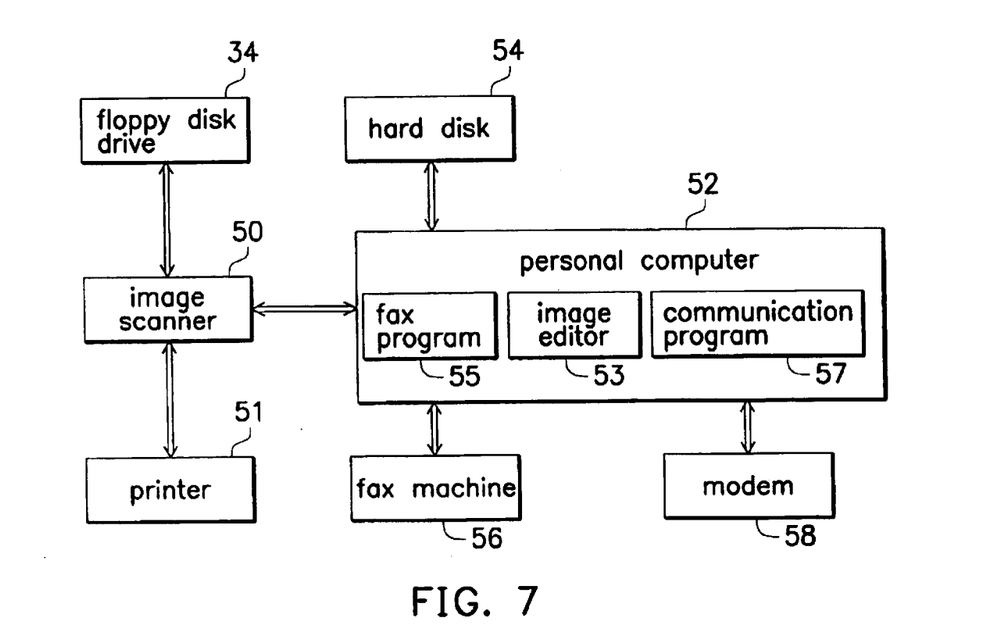
FIG. 7 is a block diagram of a sixth embodiment of the present invention.
Figure 8A:
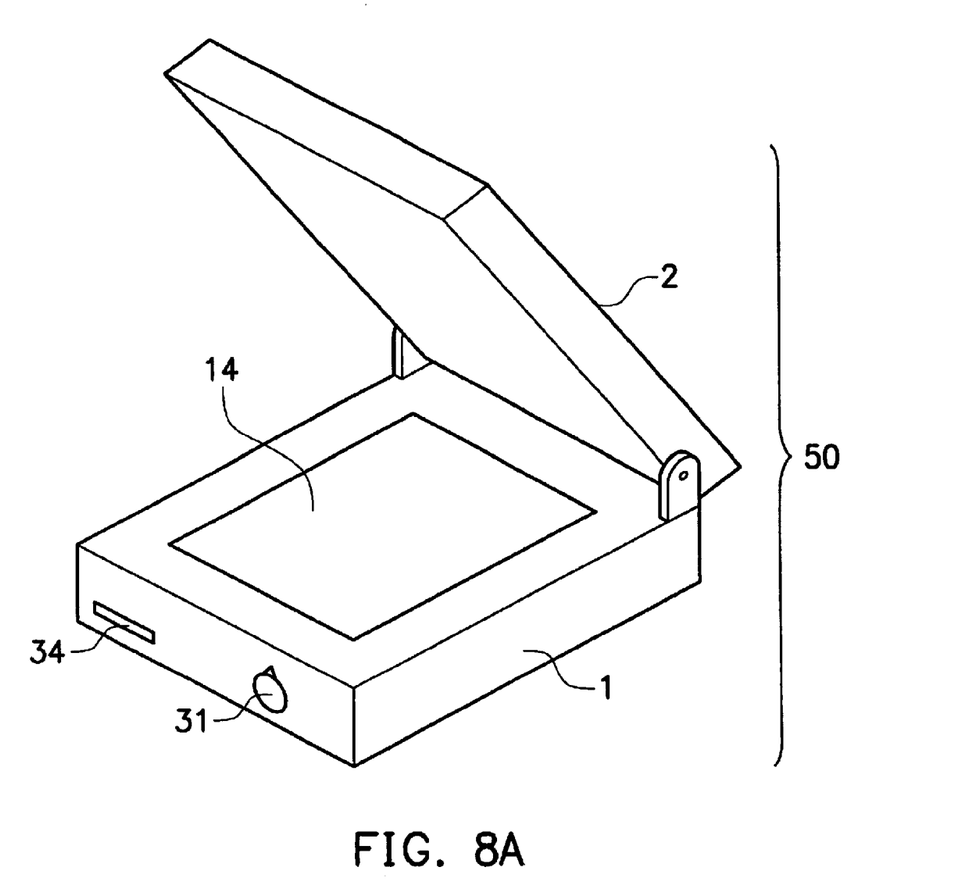
FIG. 8A is a perspective diagram of an image scanner in accordance with the sixth embodiment of the present invention.
Figure 8B:
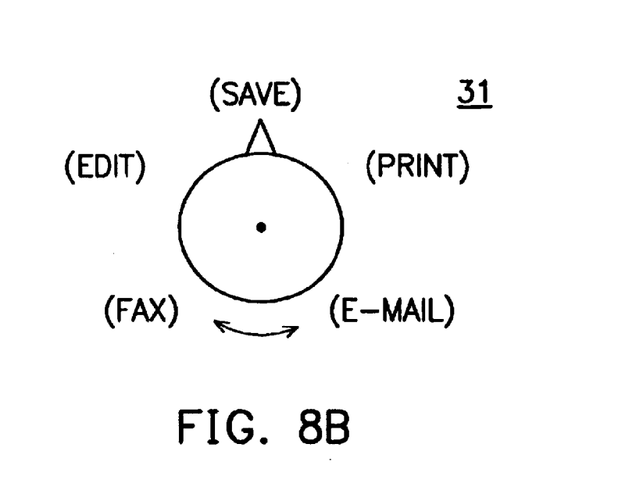
FIG. 8B is a front view of an output selection device of the image scanner of the sixth embodiment.

Embodiment six:

Referring to FIGS. 7, 8A and 8B, in this embodiment, the image scanner 50 of the present invention is connected to a personal computer 52 and a printer 51. An output selection device 31 is provided on the main body 1 of the image scanner 50. By the output selection device, the image of the scanned document is selectively sent to one of output interfaces, through which the image is printed out by a printer 51, the image is saved in a hard disk 54 of the personal computer 52 or saved in a floppy disk drive 34 of the image scanner 50, an image editor 53 is executed to edit the image, a fax program 55 is executed to send out the image by a fax machine 56, or a communication program 57 is executed to send out the image by a modem 58. This arrangement saves time and operation after the scanning. The detailed technique for selectively sending the image to the output interfaces is disclosed in U.S. Pat. No. 5,499,108 (FIG. 17 and the description thereof), in which a scanned image is sent to different output interfaces via operating a window interface.

Figure 9A:
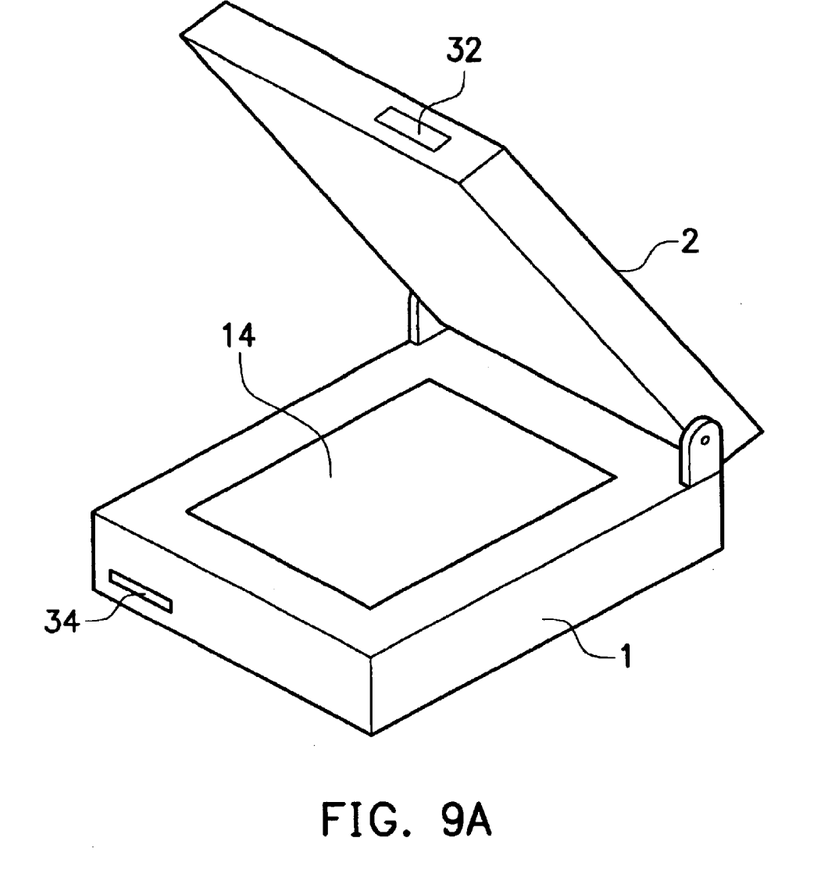
FIG. 9A is a perspective diagram of the modified image scanner of the sixth embodiment.
Figure 9B:
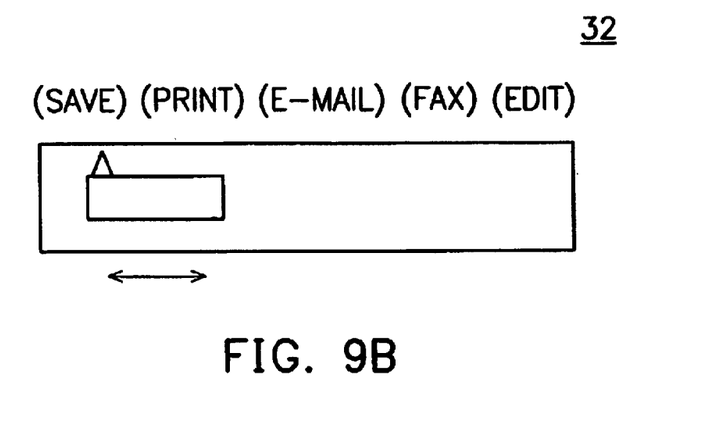
FIG. 9B is a front view of the output selection device of the modified image scanner of the sixth embodiment.

Alternatively, the output selection device is provided on the cover 2 as shown in. FIGS. 9A and 9B, in which reference number 32 indicates the output selection device. Also, the output selection device 32 operates in the way of a linear movement rather than a rotation.

Alternatively, the image scanner of the present invention can be practiced in various other ways: (1) The switch 22 disclosed in the fifth embodiment of the present invention is omitted. Once the cover is closed, the optical module always performs the scanning in a predetermined resolution and scanning area. (2) The hardware switch 22 mentioned in the fifth embodiment is replaced with a software toggle selection, by which the user chooses the compulsory scanning on a monitor.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image scanner, including:
    a main body having a window for supporting an object;
    an optical module for scanning the object;
    a first switch coupled to the optical module;
    a cover movably connected to the main body, the cover having a first trigger member for triggering the first switch to actuate the optical module to scan the object and to generate an image of the object when the cover is closed to cover the window; and
    an output selection device, by which the image of the object is selectively sent to one of a number of output interfaces determined by the position of the output selection device.

2. The image scanner as claimed in claim 1, wherein the output interfaces include a fax machine, a disk, an image editor for a computer, a fax program and a communication program.

3. The image scanner as claimed in claim 1, further including a warning device coupled to the first switch and the optical module for warning a user when the user opens the cover before the optical module finishes scanning the object.

4. The image scanner as claimed in claim 1, wherein the cover further has a background, the brightness of which corresponds to a first gray scale value, the optical module is actuated to scan an area of the window so as to obtain a second gray scale value when the first switch is turned on, and the optical module scans the whole window if the second gray scale value is essentially different from the first gray scale value.

5. The image scanner as claimed in claim 1, further including a second switch, wherein the optical module scans the window when the first and second switches are turned on.

6. The image scanner as claimed in claim 1, wherein the first switch is a button switch, the trigger member is a bar, and the bar pushes the button switch so that the button switch is turned on when the cover is closed to cover the window.

7. The image scanner as claimed in claim 1, wherein the first switch has a body on which a recess is provided, a light emitter for emitting light and a receiver for receiving the light: the trigger is a bar; and the bar enters the recess to obstruct the light when the cover is closed to cover the window.

8. An image scanner, including:

a main body having a window for supporting an object;

an optical module for scanning the object;

a trigger member provided on the main body;

a cover movably connected to the main body, the cover having a first switch for actuating the optical module to scan the object, wherein the first switch is turned on by the trigger member so as to actuate the optical module when the cover is closed to cover the window, wherein the cover further has a background, the brightness of which corresponds to a first gray scale value, the optical module is actuated to scan an area of the window so as to obtain a second gray scale value when the first switch is turned on, and the optical module scans the whole window if the second gray scale value is greater than the first gray scale value.

9. The image scanner as claimed in claim 8, wherein the optical module scans the window when the first and second switches are turned on.

10. The image scanner as claimed in claim 8, wherein the first switch is a button switch, the trigger member is a bar, and the bar pushes the button switch so that the button switch is turned on when the cover is closed to cover the window.

11. The image scanner as claimed in claim 8, wherein the first switch has a body on which a recess is provided, a light emitter for emitting light and a receiver for receiving the light: the trigger is a bar; and the bar enters the recess to obstruct the light when the cover is closed to cover the window.

12. The image scanner as claimed in claim 8, further including an output selection device, by which the image of the object is selectively sent to one of a number of output interfaces.

13. The image scanner as claimed in claim 8, wherein the output interfaces include a fax machine, a disk, an image editor for a computer, a fax program and a communication program.

14. The image scanner as claimed in claim 8, further including a warning device for warning a user if the user opens the cover before the optical module finishes scanning the object.

15. An image scanner, including:

a main body having a window for supporting an object;

an optical module for scanning the object;

a trigger member provided to the main body;

a cover movably connected to the main body, the cover having a first switch for actuating the optical module to scan the object, wherein the first switch is turned on by the trigger member so as to actuate the optical module when the cover is closed to cover the window;

a warning device for warning a user when the user opens the cover before the optical module finishes scanning the object; and an output selection device, by which the image of the object is selectively sent to one of a number of output interfaces determined by the position of the output selection device.

* * * * *